No. 891,487.

PATENTED JUNE 23, 1908.

W. LEWIS.
METAL SAWING MACHINE.
APPLICATION FILED NOV. 17, 1905.

WITNESSES:

INVENTOR
Wilfred Lewis
BY
Francis T. Chambers
his ATTORNEY.

UNITED STATES PATENT OFFICE.

WILFRED LEWIS, OF PHILADELPHIA, PENNSYLVANIA.

METAL-SAWING MACHINE.

No. 891,487.      Specification of Letters Patent.      Patented June 23, 1908.

Application filed November 17, 1905. Serial No. 287,779.

*To all whom it may concern:*

Be it known that I, WILFRED LEWIS, a citizen of the United States of America, residing in the city and county of Philadelphia, in the State of Pennsylvania, have invented a certain new and useful Improvement in Metal-Sawing Machines, of which the following is a true and exact description, reference being had to the accompanying drawings, which form a part thereof.

My invention relates to metal sawing machines in which a circular disk provided with teeth is secured to and actuated by a rotating spindle supported in proper bearings, and more particularly my invention is applicable to machines of this kind in which the bearings for the spindle are carried by a traveling head moving on suitable guides and by which the saw is fed to its work. In saws of this character, and particularly in those in which the saw blade or disk is provided with inserted teeth, it quite frequently happens that the teeth of the saw are not continuously engaged with the work, and under this condition the saw jumps ahead when the cutting resistance ceases by reason of the elasticity in the driving gear taking up lost motion, and it is obviously true also that under the same condition the engagement of the next succeeding tooth, first of all, has the effect of taking up lost motion in the opposite direction. The consequence of this is an irregular movement of the saw, and a pounding of the teeth against the work, which tends to break them off or injure their cutting edges. Where the saw is carried on a traveling head, and particularly in the usual case where the saw cuts down on its work, the same difficulty is met with in the movements of the head, which is lifted when a tooth is engaged and dropped again when the cut of that tooth is finished, if the next tooth is not already in engagement with the work.

The object of my invention is to provide efficient and simple means for obviating the defects above noted, and my invention consists, broadly speaking, first in providing resilient means acting to press the spindle against its bearing in the same direction in which it is pressed when the machine is at work, and, in the second place, in providing resilient means acting to press the head against the guideway on which it moves also in the same direction in which it is pressed during the working of the machine.

Figure 1:
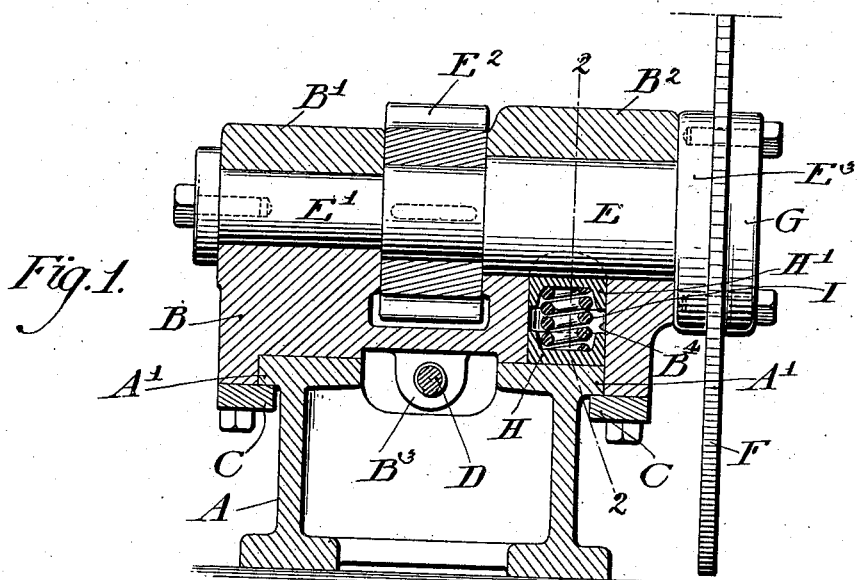
Figure 2:
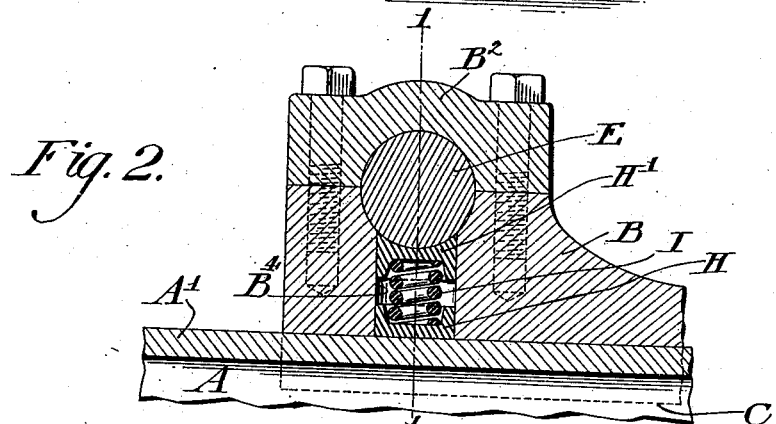

The general character of my invention and the details of improvement will be best understood as described in connection with the drawings and in which Figure 1, is a cross sectional elevation of a sawing machine provided with my improvements in what I believe to be their best and most convenient form, the section being taken as on the line 1—1 of Fig. 2. Fig. 2, is a cross section on the line 2—2 of Fig. 1, and Fig. 3, a cross sectional view, similar to Fig. 2, but illustrating modification in the arrangement and construction of the resilient devices for holding the moving parts in the desired positions.

A, indicates the frame or base of the machine, which, as shown, is provided with the guideways A', A'.

B, is the sliding head moving on the guideways and provided with the guide engaging flanges indicated at C, C, and with the removable spindle bearings or caps indicated at B' and $B^2$, and also provided with a threaded lug or lugs such as indicated at $B^3$. This head as shown in Figs. 1 and 2, is formed with a chamber or cavity $B^4$, extending between the bottom bearing for the spindle and oppositely situated portion of the guideway.

D, is a feed screw by which the head is moved forward and backward along the guideway, E, E', the saw spindle to which is secured a driving gear wheel $E^2$, and a head $E^3$, to which head the saw blade F, is clamped through a disk G, and suitable bolts passing through this disk and the saw blade into the head $E^3$.

H, H', are movable abutments, the lower one H, resting against the surface of the guideway, and the upper one H', resting against the spindle portion E, adjacent to the saw blade, and I, is a spring situated between the two abutments and pressing them downward and upward against the guideway and the spindle, the abutments of course being held into place and guided by contact with the walls of the cavity $B^4$.

It will be obvious that the pressure on the abutment H', will press and hold the spindle against the upper part or cap $B^2$, of its bearing, while the pressure of the abutment H, on the guideway will tend to lift the head B, and press the lug C, against the under side of the guideways A', thus holding the head and spindle permanently in the positions which they occupy when the saw is engaged with and operating upon its work. The abutment H' being resiliently pressed at all times against the shaft E exerts a constant retarding force on the shaft, which prevents the saw from jumping ahead whenever it clears the work, which it would otherwise do on account of the inherent lost motion and elasticity in the driving connection.

Figure 3:
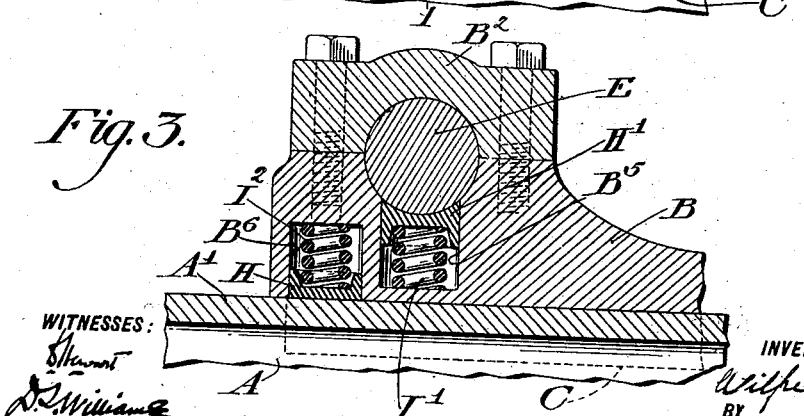

My invention may obviously be applied in various forms without departure from its essential features, and in Fig. 3, I have indicated a modified construction in which a chamber $B^5$, is provided in substantially the same position as the chamber $B^4$, but opens only upward against the spindle, this having the advantage of holding the oil in the spindle bearing, a second chamber $B^6$, being provided in the head B, which opens only downward against the guideway. The abutment head H', is located in the chamber $B^5$, and pressed upward by a spring I', while the abutment head H, is located in the chamber $B^6$, and pressed downward by a spring $I^2$, the net effect of the two springs being substantially the same as that of the spring I, in the construction of Figs. 1 and 2.

Having now described my invention, what I claim as new and desire to secure by Letters Patent is:

1. A metal sawing machine having in combination a rotary saw spindle, a bearing therefor and resilient means pressing the spindle against the same side of the bearing against which it is pressed by the resistance of the work when the saw is in operation.

2. A metal sawing machine having in combination a guideway, a head moving thereon and carrying a bearing for the saw spindle, a saw spindle and resilient means pressing the head against the guideway in the same direction that it is pressed in the operation of the machine.

3. A metal sawing machine having in combination a guideway, a head moving thereon and carrying a bearing for the saw spindle, a saw spindle and resilient means acting to press the head against the guideway and the spindle against its bearing both in the same direction they are pressed during the operation of the machine.

4. A metal sawing machine having in combination a guideway, a head moving thereon and carrying a bearing for the saw spindle, a saw spindle, two oppositely placed movable abutments, one resting against the guideway and the other against the spindle and resilient means acting on both abutments to press the head against the guideway and the spindle against its bearing.

5. A metal saw machine having in combination a guideway, a head moving thereon and carrying a bearing for the saw spindle, a saw spindle, two oppositely placed movable abutments situated in and guided by a cavity in the head, one resting against the guideway and the other against the spindle, and an interposed spring acting on both abutments to press the head against the guideway and the spindle against its bearing.

WILFRED LEWIS.

Witnesses:
 ARNOLD KATZ,
 D. STEWART.